March 13, 1945.  C. J. RHODES  2,371,411
MACHINE FOR CUTTING OR SHEARING SHEETS OR PLATES OF METAL
Filed Feb. 16, 1943  5 Sheets-Sheet 2

Inventor
Charles Joseph Rhodes
By Mock & Blum
Attorneys

March 13, 1945. C. J. RHODES 2,371,411
MACHINE FOR CUTTING OR SHEARING SHEETS OR PLATES OF METAL
Filed Feb. 16, 1943 5 Sheets-Sheet 3

Inventor
Charles Joseph Rhodes
By Moxon & Burn
Attorneys

March 13, 1945.  C. J. RHODES  2,371,411
MACHINE FOR CUTTING OR SHEARING SHEETS OR PLATES OF METAL
Filed Feb. 16, 1943  5 Sheets-Sheet 4
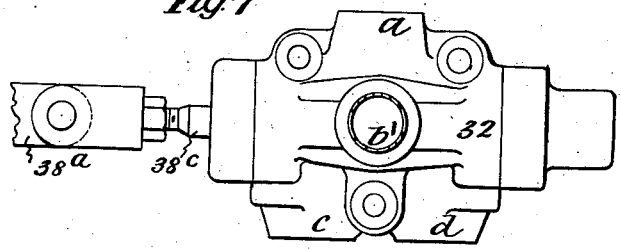
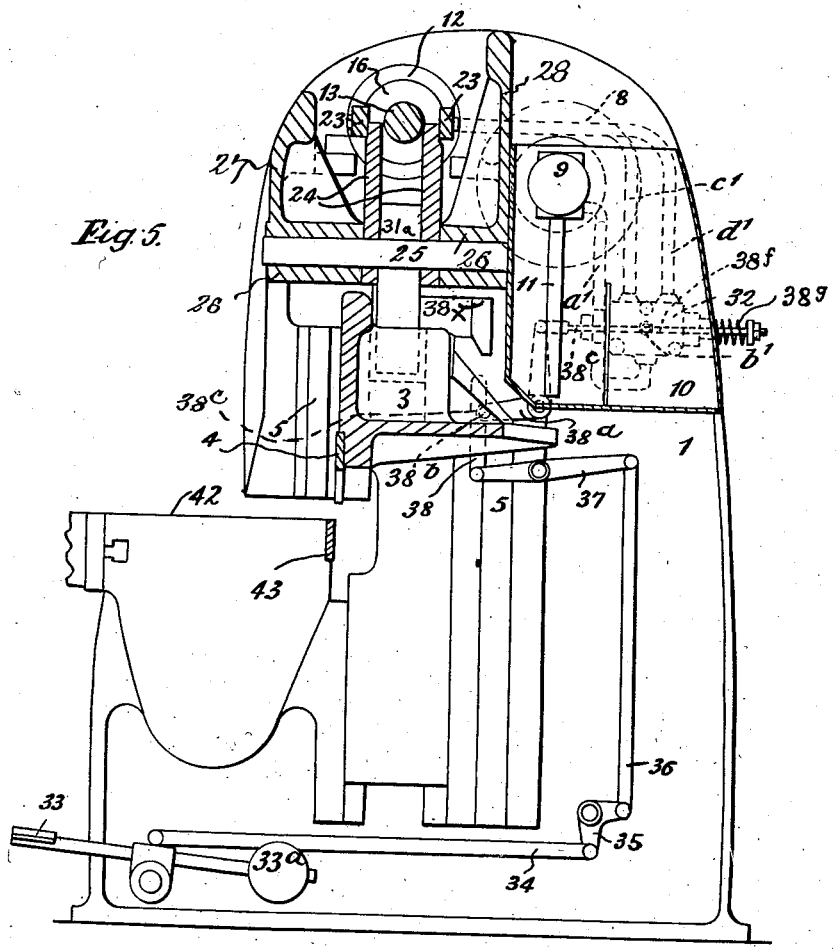
Inventor
Charles Joseph Rhodes
By Mock & Blum
Attorneys

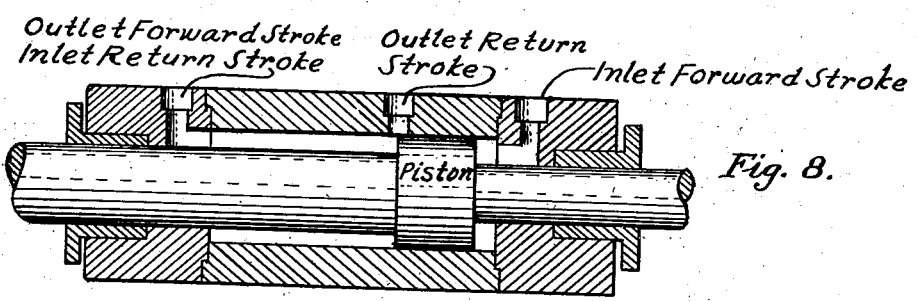
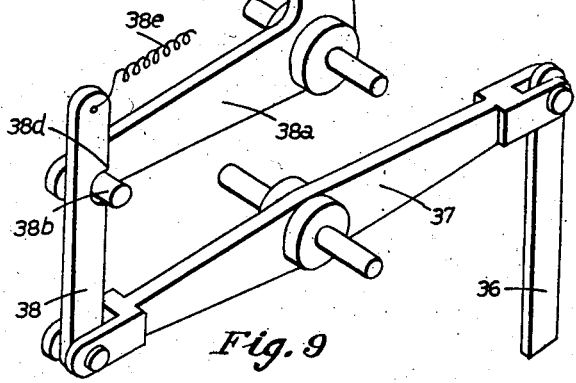
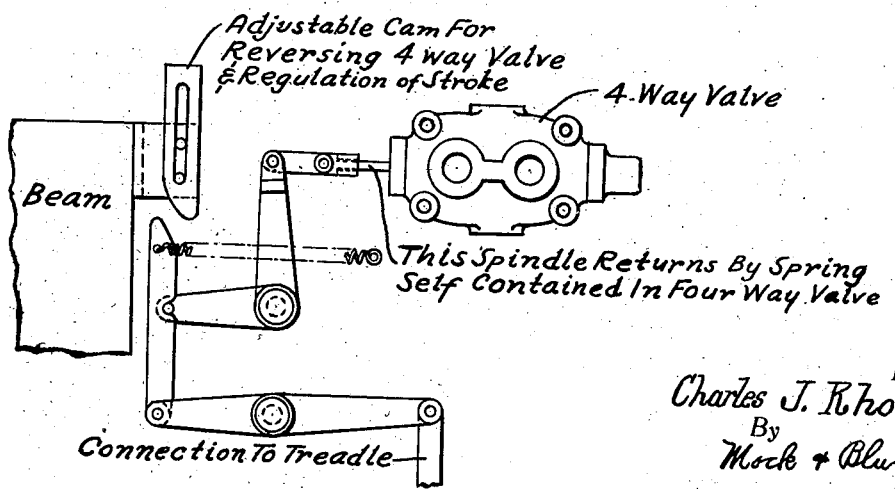

Patented Mar. 13, 1945

2,371,411

UNITED STATES PATENT OFFICE 2,371,411

MACHINE FOR CUTTING OR SHEARING SHEETS OR PLATES OF METAL

Charles Joseph Rhodes, Wakefield, England

Application February 16, 1943, Serial No. 476,034
In Great Britain April 22, 1942

10 Claims. (Cl. 164—56)

This invention relates to machines for cutting or shearing sheets or plates of metal, and it has for its object to provide improved means for operating the shearing beam of such a press.

According to the present invention, the beam, during the cutting stroke, is operated by means of a hydraulic jack, which may be either operated by hand, or the beam may be actuated by a plunger in a cylinder to which liquid under pressure is supplied by means of an electrically or other power actuated pump.

The arrangement may be such that the return of the beam will be effected by means of springs or counterweights, which are effective when the release valve of the cylinder, one-way actuated, is opened or where a plunger is employed within a cylinder the beam will alternately be two way operated by the plunger, both during the cutting and return stroke of the beam.

In order that the invention may be the better understood, reference is made to the accompanying drawings illustrating a machine embodying one form of the invention, and in which:

Fig. 5 is a section on line C—C Fig. 2.

Figure 5A is a detail view of the lever and trip mechanism.

Fig. 7 is a view to a larger scale than that of Fig. 5 showing the four way valve.

Fig. 8 is a sectional view showing the different areas on the down and up strokes and Fig. 9 is a view disclosing a modification of the cam adjustment.

Figure 1:
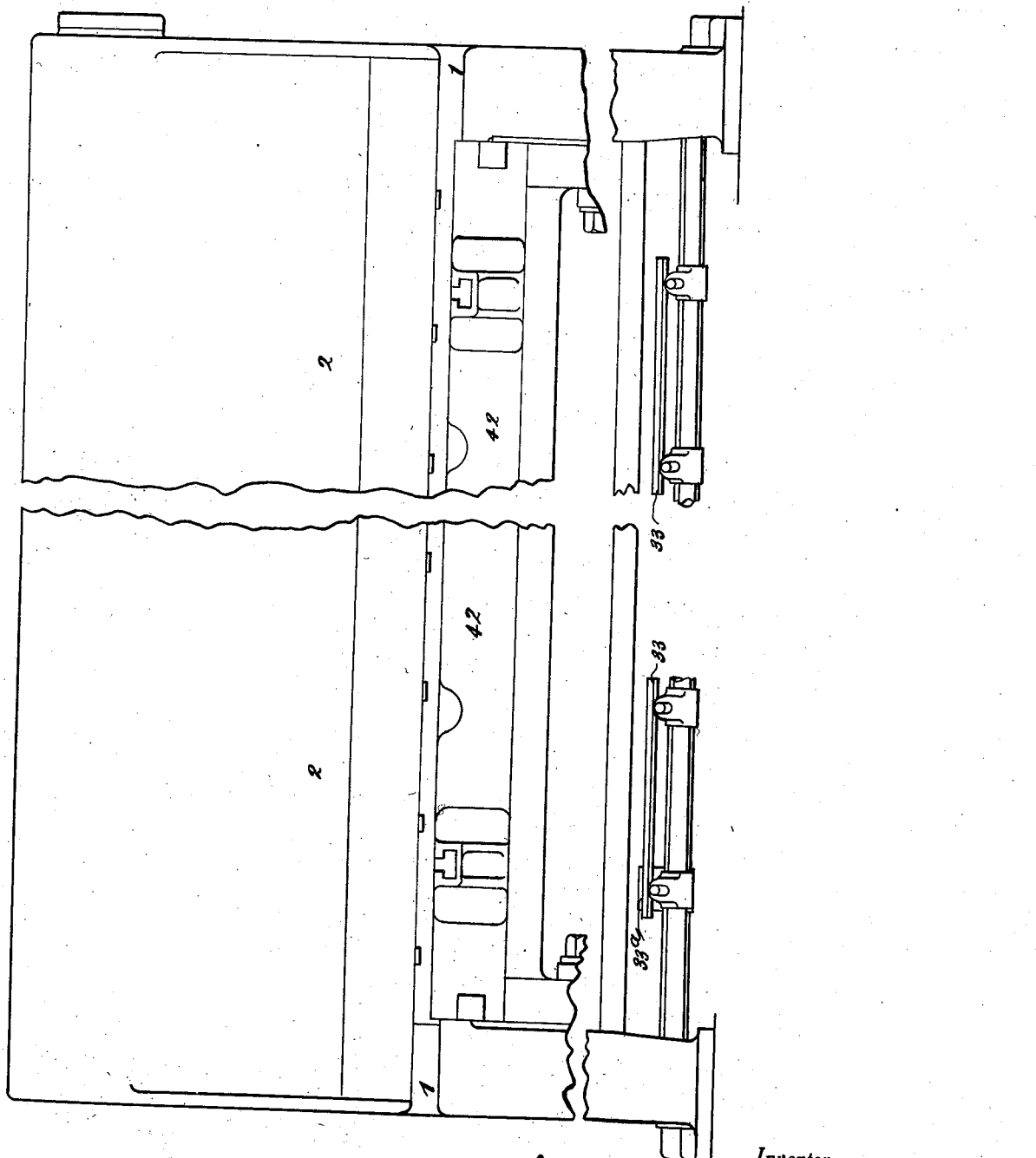
Fig. 1 is a front view of the machine.
Figure 2:
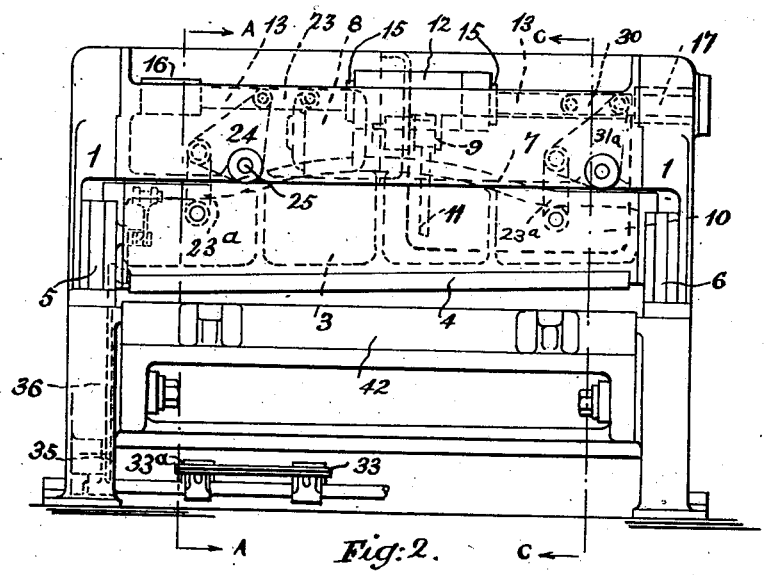
Fig. 2 is a front view with the cover plate removed.
Figure 3:
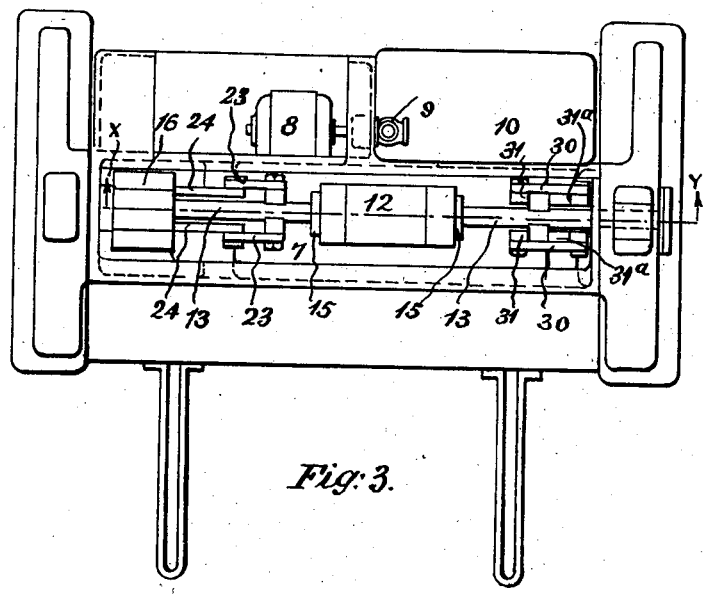
Fig. 3 is a plan showing the arrangement of the mechanism for operating the beam carrying the movable blade.
Figure 4:
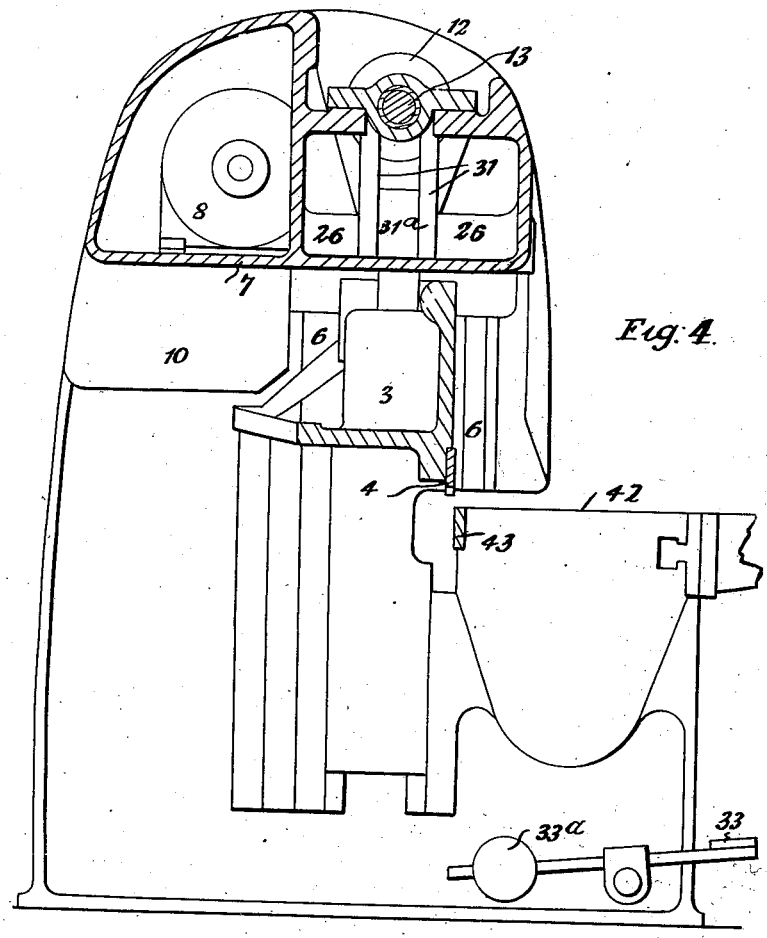
Fig. 4 is a section on line A—A Fig. 2.
Figure 6:
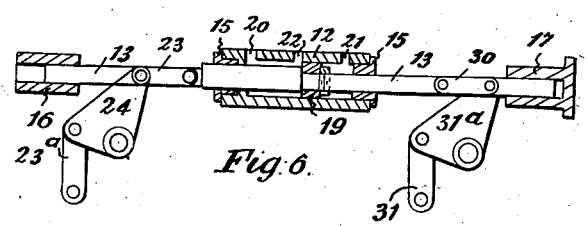
Fig. 6 is a sectional view of the operating mechanism for the beam taken upon line X—Y Fig. 3.

Referring to the accompanying drawings, 1 indicates the frame of the machine and 2 the cover plate for the front of the machine. 3 indicates the beam carrying the upper blade 4, said beam working in guides 5, 6 provided upon the inner faces of the respective end members of the frame of the machine. 7 indicates a horizontal partition upon which is mounted an electric motor 8 driving a pump 9, whereby oil is drawn from the reservoir 10 through pipe 11 and fed to the cylinder 12. 13 indicates a rod passing through the cylinder 12 as shown, and for which rod stuffing boxes and glands 15 are provided at each end of the cylinder. Guides 16, 17 are provided for the ends of the rod, said rod and cylinder being disposed upon a line parallel to the beam 3.

The rod 13 is provided with a double acting piston 19 and the cylinder 12 is provided with ports 20, 21, 22, the ports 20, 21 serving for the admission of the oil whilst the port 22 acts as an exhaust port through which the oil is permitted to escape from the cylinder and is returned to the reservoir 10.

Connected at their inner ends to the rod 13, at a suitable distance from the left hand end of cylinder 12, and disposed one on each side of the rod 13, are links 23 connected at their outer ends to levers 24 pivotally mounted upon a spindle 25, for which bearings 26 are provided as shown more clearly in Fig. 5 upon the upstanding walls 27, 28. Other links 23a connect the levers 24 with the beam 3.

A similar arrangement of links 30, and 31 and levers 31a is provided upon the right hand side of the cylinder 12. The passage of the oil to and from the cylinder 12 is controlled as will be presently more fully described by a four way valve 32, said valve in its turn being operated by the foot lever 33 and rod and lever system 34, 35, 36, 37, the trip mechanism 38 and the lever 38a, one arm of which carries a pin 38b engaging a slot 38d in one end of the rod 38, the other end of said lever being connected to the slide of the four way valve 32. The various parts just described under the action of the weight 38a normally occupy the positions shown in Fig. 5, the rod 38 being held in engagement with pin 38b by means of a spring. A suitably ported sliding member 38f within the valve controls the passage of the oil, said slide being actuated in one direction by means of a spring. 42 indicates the table of the machine to which is secured the lower blade 43.

In Fig. 7 the d indicates the point of connection for the pipe d1 whereby oil is permitted to flow to the cyliner 12 for effecting the forward stroke of the piston. C is the point of connection for the pipe c1 whereby the oil is admitted to the cylinder in order to effect the return stroke of the piston, and there is a point of connection for the pipe b1 for returning the oil to the reservoir 10. The point of connection for the pipe for supplying oil to the pump is indicated by 9.

The arrangement is such, that so long as the pedal is depressed, the valve is automatically reversed at the end of the stroke, but should the foot be removed from the treadle before the end of the stroke, a correspondingly shorter stroke is made. This arrangement presents the advantage that the stroke may be regulated according to the length of the cut to be made and thus increases the output.

38x indicates a fixed cam plate the purpose of which will be presently more clearly explained.

Suitable provision is made for opening and closing the hydraulic circuit.

When the foot pedal is depressed, the operating rod for the slide of the four way valve moves to a position compressing the spring within the valve acting upon said slide, thus opening the forward stroke inlet. During the downward stroke of the beam, cam 38x makes contact with the latch of the trip mechanism, and at the bottom of the stroke the pin 38b is released from the slot 38d, whereupon the operating rod is free to move to its original position under the action of the compression spring inside the four way valve. The output of the pump will then flow via return stroke inlet, lifting the beam to the top of its stroke. The latch is connected to a tension spring 38e and upon the release of the foot lever the pin 38b re-engages in the slot 38d lever 38.

By adjustably connecting the cam plate 38x to its support, it is possible to so arrange the stroke of the beam as to make a cut of predetermined length each time the pedal is depressed, or the arrangement may be such that the beam will be automatically returned after it has moved a certain distance. Provision is made whereby the stroke of the beam may be adjusted to produce any desired length of stroke.

Instead of employing a double acting cylinder to secure the positive operation of the beam in both directions two cylinders and plungers could be used, one effective whilst the cutting or shearing is being carried on, the other supplying the power to return the beam after the cutting operation had been completed. As the load to return the beam is much smaller than that required for the cutting operation, the second or return cylinder could be of much smaller diameter than the first cylinder, so that the speed at which the beam travels during its return is much higher than it is when shearing.

I claim:

1. A machine for cutting or shearing metal comprising a fixed cutting blade, a movable member, a cutting blade upon said member, an oil reservoir, a pump connected to said reservoir, a motor for driving said pump, a connection between said pump and the oil reservoir, a horizontal cylinder, a double acting piston in said cylinder, admission and exhaust ports for the cylinder, a valve for controlling the passage of the oil to the cylinder and its admission to and exhaust from said cylinder, a rod parallel to the movable member for said piston projecting from each end of the cylinder and a lever disposed at each end of the piston rod for operating the movable member, means for controlling the operation of the valve, and means for controlling the operation of the motor.

2. A machine for cutting or shearing metal comprising a fixed cutting blade, a movable member, a cutting blade upon said member, an oil reservoir, a pump connected to said reservoir, a motor for driving said pump, a connection between said pump and the oil reservoir, a cylinder, a double acting piston in said cylinder, admission and exhaust ports for the cylinder, a valve for controlling the passage of the oil to the cylinder and its admission to and exhaust from said cylinder, a rod for said piston projecting from each end of the cylinder and a lever disposed at each end of the piston rod for operating the movable member, means for controlling the operation of the valve whereby the travel of the movable member may be regulated to produce a predetermined length of cut each time the pedal is actuated, and means for controlling the operation of the motor.

3. A machine for cutting or shearing metal comprising a fixed cutting blade, a movable member, a cutting blade upon said member, an oil reservoir, a pump connected to said reservoir, a motor for driving said pump, a connection between said pump and the oil reservoir, a cylinder, a double acting piston in said cylinder, admission and exhaust ports for the cylinder a valve for controlling the passage of the oil to the cylinder and its admission to and exhaust from said cylinder, a rod for said piston projecting from each end of the cylinder and a lever disposed at each end of the piston rod for operating the movable member, means for controlling the operation of the valve whereby the machine may be caused to continue to function, and means for controlling the operation of the motor.

4. A machine for cutting or shearing metal comprising a fixed cutting blade, a movable beam, a cutting blade upon said beam, a double acting hydraulic cylinder disposed with its axis parallel to said beam, a piston in said cylinder, a piston rod projecting through both ends of said cylinder, guides for both ends of the piston rod allowing movement thereof parallel to said beam, a pair of rocking levers mounted on fixed pivots, having one arm associated with opposite ends of the piston rod and their other arms associated with opposite ends of said beam and means for controlling the supply of pressure fluid to either end of said cylinder at will to raise or lower said beam.

5. A machine for cutting or shearing metal comprising a fixed cutting blade, a movable beam, a cutting blade upon said beam, a double acting hydraulic cylinder disposed with its axis' parallel to said beam, a piston in said cylinder, a piston rod projecting through both ends of said cylinder, guides for both ends of the piston rod allowing movement thereof parallel to said beam, a pair of rocking levers mounted on fixed pivots, links articulating one arm of said levers to opposite ends of the piston rod, links articulating the other arm of said levers to opposite ends of said beam, and means for controlling the supply of pressure fluid to either end of said cylinder at will to raise or lower the said beam.

6. A machine as set forth in claim 4, including a source of pressure fluid supply, a distributing valve for directing pressure fluid to either end of said hydraulic cylinder, and manually operated lever means for operating said distributing valve.

7. A machine as set forth in claim 4, including a source of pressure fluid supply, a distributing valve for directing pressure fluid to either end of said hydraulic cylinder, means for automatically reversing said valve at the end of each stroke of said beam, and manually operated lever means adapted to reverse said valve during the execution of a stroke by said beam.

8. A machine as set forth in claim 4, including a source of pressure fluid supply, a distributing valve for directing pressure fluid to either end of said hydraulic cylinder, a spring normally pressing said valve into a position for raising said beam, a foot lever, and a lever system adapted to be operated by said foot lever to move said valve into beam lowering position against the action of its spring.

9. A machine as set forth in claim 4, including a source of pressure fluid supply, a distributing valve for directing pressure fluid to either end of said hydraulic cylinder, a spring normally pressing said valve into a position for raising said beam, a foot pedal, and a lever system adapted to be operated by said foot pedal to move said valve into beam lowering position against the action of its spring, said lever system including a member which can be tripped to break the continuity of said system, in combination with a cam carried by said beam adapted to operate said trip member and allow movement of said distributing valve into beam raising position, after the beam has travelled a predetermined distance.

10. A machine as set forth in claim 4, including a double acting hydraulic cylinder having piston surfaces or different effective areas, the down stroke of the beam being produced by the piston surface of a larger effective area, and the up stroke of the beam being produced with less power by the piston surface of smaller effective area.

CHARLES JOSEPH RHODES.